US010754496B2

(12) United States Patent
Kiemele et al.

(10) Patent No.: US 10,754,496 B2
(45) Date of Patent: Aug. 25, 2020

(54) VIRTUAL REALITY INPUT

(71) Applicant: Microsoft Technology Licensing, LLC, Redmond, WA (US)

(72) Inventors: Kenneth Liam Kiemele, Redmond, WA (US); Michael Robert Thomas, Redmond, WA (US); Alexandre Da Veiga, Seattle, WA (US); Christian Michael Sadak, Seattle, WA (US); Bryant Daniel Hawthorne, Duvall, WA (US); Aaron D. Krauss, Snoqualmie, WA (US); Aaron Mackay Burns, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 15/685,870

(22) Filed: Aug. 24, 2017

(65) Prior Publication Data
US 2019/0065026 A1    Feb. 28, 2019

(51) Int. Cl.
*G06F 3/0481* (2013.01)
*G06F 3/0488* (2013.01)
(Continued)

(52) U.S. Cl.
CPC .......... *G06F 3/04815* (2013.01); *A63F 13/26* (2014.09); *A63F 13/5255* (2014.09);
(Continued)

(58) Field of Classification Search
CPC ...... G06F 3/04815; G06F 3/011; A63F 13/26; A63F 13/5255; A63F 13/92; G02B 27/0172
See application file for complete search history.

(56) References Cited

U.S. PATENT DOCUMENTS 9,066,200 B1   6/2015  Loxam et al.
9,218,212 B2  12/2015  Do et al.
(Continued)

FOREIGN PATENT DOCUMENTS

WO   2016118606 A1   7/2016
WO   2016123035 A1   8/2016
(Continued)

OTHER PUBLICATIONS

Lee, Max, "HTC Vive VR Unboxing", Retrieved from https://www.youtube.com/watch?v=_Tj6DcMcptY&t=822s, May 4, 2016, 1 Page.
(Continued)

*Primary Examiner* — Sejoon Ahn
(74) *Attorney, Agent, or Firm* — Alleman Hall Creasman & Tuttle LLP

(57) ABSTRACT

Examples are disclosed herein that relate to receiving virtual reality input. An example provides a head-mounted display device comprising a sensor system, a display, a logic machine, and a storage machine holding instructions executable by the logic machine. The instructions are executable to execute a 3D virtual reality experience on the head-mounted display device, track, via the sensor system, a touch-sensitive input device, render, on the display, in a 3D location in the 3D virtual reality experience based on the tracking of the touch-sensitive input device, a user interface, receive, via a touch sensor of the touch-sensitive input device, a user input, and, in response to receiving the user input, control the 3D virtual reality experience to thereby vary visual content being rendered on the display.

13 Claims, 9 Drawing Sheets

(51) Int. Cl.

| | | |
|---|---|---|
| *G06T 19/00* | (2011.01) | |
| *G06F 3/0484* | (2013.01) | |
| *G06F 3/0346* | (2013.01) | |
| *G02B 27/01* | (2006.01) | |
| *G06F 3/0354* | (2013.01) | |
| *A63F 13/26* | (2014.01) | |
| *G06F 3/01* | (2006.01) | |
| *A63F 13/5255* | (2014.01) | |
| *A63F 13/92* | (2014.01) | |
| *G06T 19/20* | (2011.01) | |

(52) U.S. Cl.
CPC .......... *A63F 13/92* (2014.09); *G02B 27/0172* (2013.01); *G06F 3/011* (2013.01); *G06F 3/0346* (2013.01); *G06F 3/03547* (2013.01); *G06F 3/0488* (2013.01); *G06F 3/04845* (2013.01); *G06T 19/006* (2013.01); *G02B 27/017* (2013.01); *G02B 2027/014* (2013.01); *G02B 2027/0187* (2013.01); *G06F 3/012* (2013.01); *G06F 3/013* (2013.01); *G06F 3/017* (2013.01); *G06T 19/20* (2013.01); *G06T 2219/2016* (2013.01)

(56) References Cited

U.S. PATENT DOCUMENTS

| | | |
|---|---|---|
| 9,542,011 B2 | 1/2017 | Huang et al. |
| 2008/0074560 A1* | 3/2008 | Ichieda ................ H04N 9/3147 348/739 |
| 2010/0287485 A1 | 11/2010 | Bertolami et al. |
| 2010/0328204 A1* | 12/2010 | Edwards ................ G06F 3/011 345/157 |
| 2013/0141419 A1 | 6/2013 | Mount et al. |
| 2013/0265220 A1* | 10/2013 | Fleischmann ........... G06F 3/011 345/156 |
| 2014/0248950 A1* | 9/2014 | Tosas Bautista .......... G06F 3/01 463/31 |
| 2014/0267234 A1 | 9/2014 | Hook et al. |
| 2014/0361977 A1* | 12/2014 | Stafford ............. G02B 27/0093 345/156 |
| 2016/0027215 A1 | 1/2016 | Burns et al. |
| 2016/0154476 A1 | 6/2016 | Wang et al. |
| 2016/0188021 A1* | 6/2016 | Jung ................ G06F 3/03547 345/157 |
| 2016/0292922 A1 | 10/2016 | Kasahara |
| 2018/0197347 A1† | 7/2018 | Tomizuka |
| 2019/0043264 A1† | 2/2019 | Tomizuka |
| 2019/0102922 A1* | 4/2019 | Gum ................ G06Q 30/0207 |

FOREIGN PATENT DOCUMENTS

| | | |
|---|---|---|
| WO | 2016144560 A1 | 9/2016 |
| WO | 2017007637 A1 | 1/2017 |

OTHER PUBLICATIONS

"International Search Report and Written Opinion Issued in PCT Application No. PCT/US2018/038656", dated Sep. 12, 2018, 15 Pages.

Taqtile. Screenshot of video entitled "HoloMaps" at 0:17 [online]. May 1, 2017 [retrieved on Jul. 24, 2019]. Retrieved form the Internet: <URL: https://vimeo.com/215573038>, 2 pages.†

\* cited by examiner
† cited by third party

VIRTUAL REALITY INPUT

BACKGROUND

In a virtual reality experience, virtual imagery is displayed in a user's field-of-view to provide a life-like, convincing feeling of occupying the experience. The virtual reality experience may allow a user to interact with virtual objects in the experience. Various input devices for facilitating such interaction exist, such as hand-held controllers that provide translational and rotational input.

DETAILED DESCRIPTION

In a virtual reality experience, virtual imagery is displayed in a user's field-of-view to provide a life-like, convincing feeling of occupying the experience in an immersive way. The virtual reality experience may allow a user to interact with virtual objects in the experience. Various input devices for facilitating such interaction exist, such as hand-held controllers that provide translational and rotational input.

Hand-held controllers can present various drawbacks when used to provide interaction in a virtual reality experience. For example, some controllers may be unable to provide other types of input beyond translation and rotation. Further, such controllers are often designed specifically for virtual reality experiences and thus tend to be unfamiliar to users as they are becoming acquainted with virtual reality technology. Gaining virtual reality experience may also require acclimation to the tactile feel of a controller for a user to be aware of its actuation, as visual feedback indicating such actuation may be unavailable due to the controller's lack of display in the virtual reality experience. In other virtual reality experiences, hand gestures may facilitate interaction. Such experiences, however, may require gesture detection by a dedicated sensor system, and may suffer from gesture ambiguity and a limited variety of possible gestures.

Accordingly, implementations are disclosed herein that relate to receiving user input from a touch-sensitive input device in a virtual reality experience. In some examples, the touch-sensitive input device may enable the reception of touch input, which may be an intuitive and familiar input paradigm to a user (e.g., as a result of repeated, daily use of a smart-phone). Touch and/or other types of input may extend the range of inputs that can be supplied beyond translation and rotation enabled by the hand-held controllers described above. The input device itself may also provide a familiar paradigm of interaction, as in some examples the input device may be, as referenced above, a smart/phone or other mobile device of the user. Moreover, the virtual reality experience may complement and/or extend input device functionality. As described in further detail below, the virtual reality experience may render a representation of the input device that visually indicates the device and also provides a user interface for interacting with the device and virtual reality experience. In some examples, the user interface may provide additional information and points of interaction beyond a user interface rendered by the input device itself.

Figure 1:
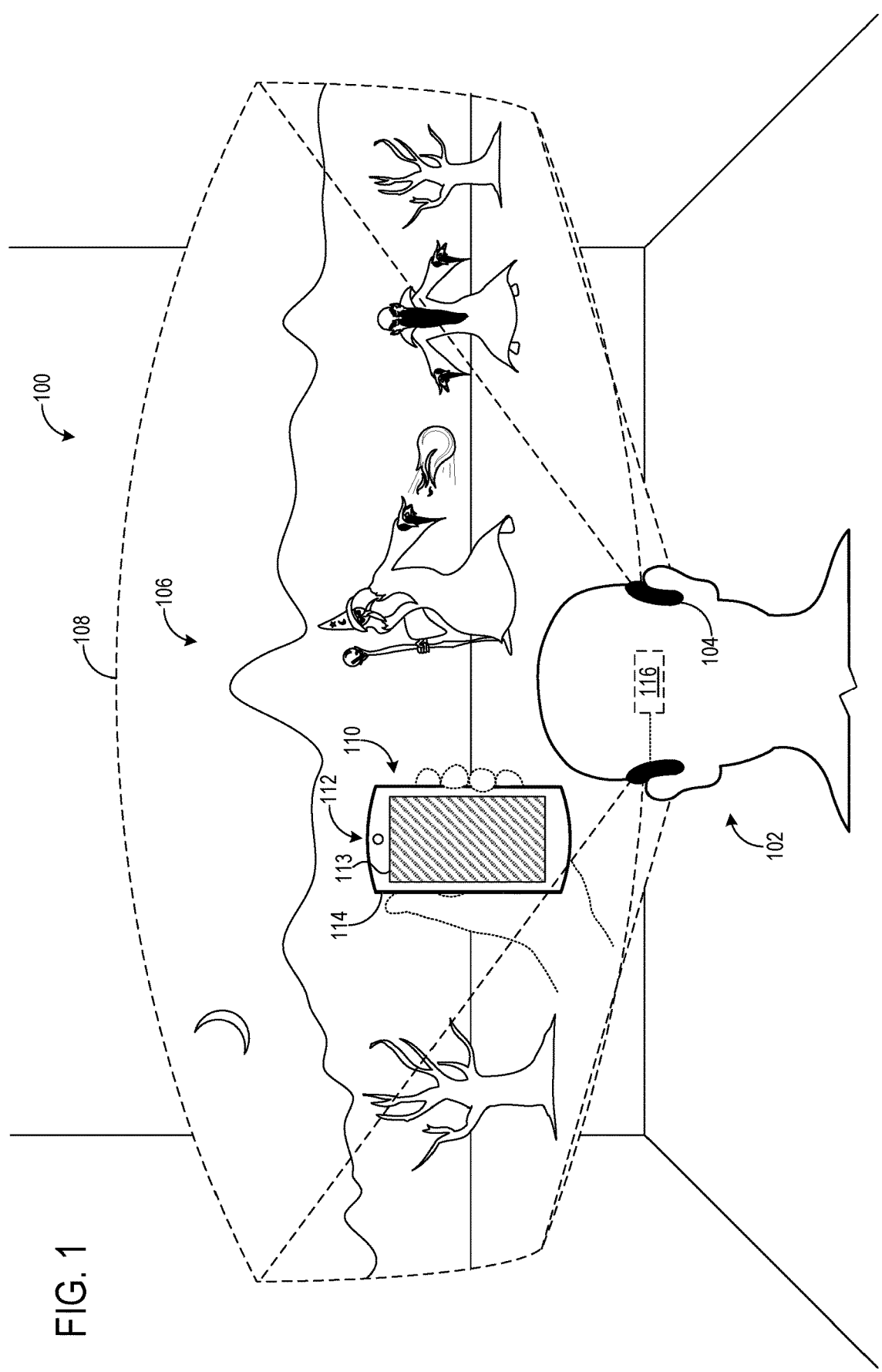
FIG. 1 shows an example use environment.

FIG. 1 shows an example use environment 100 in which a user 102 is engaged in a three-dimensional (3D) virtual reality experience executed on a head-mounted display (HMD) device 104. As part of the virtual reality experience, virtual content 108 is rendered on a display of HMD device 104 in a region 108, which may be greater than, less than, or coextensive with the user's field-of-view. Aspects of user 102 may be tracked also as part of the virtual reality experience. For example, head motion and/or a gaze direction of user 102 may be tracked so that virtual content 106 is rendered responsive to changes in user position and/or orientation to provide an immersive and convincing virtual reality experience that reflects changes to the user's perspective.

A touch-sensitive input device 110 may facilitate interaction with the virtual reality experience. Input device 110 includes a touch sensor configured to receive user input, which may be provided to HMD device 104 and used to control the 3D virtual reality experience by varying visual content 106 rendered on the HMD display. User input received by the touch sensor may include touch, hover, and/or hand gesture input, for example, and may be sensed via any suitable touch sensing technology (e.g., capacitive, resistive, acoustic, optical). The user input may influence the rendering of visual content 106 in various ways, examples of which are depicted below with reference to FIGS. 2-6. Briefly, and without limitation, input device 110 may enable one or more of (1) drawing of visual content, which may be displayed on HMD device 104 as two-dimensional (2D) or 3D imagery, (2) editing and/or manipulation of visual content rendered on the HMD device, and (3) display and selection of user interface controls that affect visual content, among other potential functions.

HMD device 104 may track touch-sensitive input device 110 and render a user interface 112 based on the tracking of the input device. User interface 112 may include a representation of input device 110 (e.g., an image of a user's smartphone). In the example depicted in FIG. 1, user interface 112 includes a display portion 113 and a body portion 114 that are rendered in 3D locations in the virtual reality experience that respectively correspond to the real-world locations of a display and a body of input device 110. Were user 102 to view input device 110 in the real, physical environment held at the location represented in FIG. 1, the display and body would appear substantially coextensive with display portion 113 and body portion 114 in the virtual reality experience. As such, and by potentially rendering display portion 113 and body portion 114 with substantially the same apparent size and angular orientation as their real-world counterparts, the portions may mimic or simulate the real-world appearance of input device 110. Thus, user input device 110 may be represented in a convincing and familiar manner, appearing to positionally occupy the virtual reality experience with functionality that the user is familiar with. Despite the occlusion of the real-world appearance of input device 110 by the virtual reality experience, user 102 may retain the ability to visually locate the input device via its representation, where the user may view information presented by user interface 112 and/or provide input to the input device. However, HMD device 104 may render any suitable user interface and/or representation of input device 110, further examples of which are described below. Other representations may be rendered as well, such as a representation of the hands of user 102.

HMD device 104 includes a sensor system 116 for tracking touch-sensitive input device 110. In some examples, a communications subsystem may at least partially implement sensor system 116 by receiving signals from input device 110 that enable tracking of the input device. The signals may be received via a wired or wireless connection to input device 110, which may communicatively couple to HMD device 104 via a direct connection or indirectly through a suitable network. The signals may include any suitable information enabling tracking of input device 110, such as output from one or more inertial measurement units (e.g., accelerometer, gyroscope, magnetometer) in the input device, a global positioning system (GPS) sensor in the input device, etc. In some examples, the signals may indicate the position (e.g., in the form of a three-dimensional coordinate) and/or orientation (e.g., in the form of a three-dimensional rotational coordinate) of input device 110. Alternatively or in addition to receiving tracking signals from input device 110, sensor system 116 may include one or more optical sensors for tracking the input device. For example, sensor system 116 may employ a visible light and/or depth camera to locate and segment image data corresponding to input device 110 from other image data. Additional detail regarding example hardware configurations of HMD device 104 is described below with reference to FIGS. 8 and 9.

Various modifications to the example configuration depicted in FIG. 1 are contemplated. For example, HMD device 104 may alternatively take the form of a mixed reality display device including an at least partially transparent display with which virtual, rendered imagery is overlaid on real, background imagery corresponding to the surrounding physical environment. As such, "virtual reality" and "virtual reality experience" as used herein may also refer to mixed reality and mixed reality experiences, and one or more of the examples described herein that relate to the use of touch-sensitive input device 110 for interacting with a virtual reality experience may be adapted to a mixed reality experience. Further, the approaches described herein may be implemented on display device types other than a head-mounted display device, such as a non-head-mounted head-up display. Similarly, while shown in the form of a mobile device such as a smartphone, tablet, etc., input device 110 may assume other forms, including but not limited to that of a game console, controller, appliance, etc.

In some examples, user interface 112 may include a representation of visual content rendered on touch-sensitive input device 110. For example, display portion 113 may substantially reproduce the visual content rendered on the display of input device 110, enabling user 102 to bring input device functionality into the virtual reality experience, such as phone conversations and software applications. To this end, input device 110 may transmit the contents of a display buffer (e.g., in compressed or uncompressed form), and/or other data enabling HMD device 104 to render the visual content, to the HMD device. In these examples, the display of input device 110 may be turned off while its visual content is rendered on HMD device 104. In other examples, HMD device 104 may capture, via one or more optical sensors of the sensor system, the visual content rendered on the display of input device 110 and make use of it to influence the experience being provided by the HMD. Further, HMD device 104 may process visual content rendered on input device 110 in representing the visual content to reduce issues associated with a potential mismatch between the display resolution of the HMD device and that of the input device. Generally, HMD device 104 may generate a representation of any suitable output from input device 110. As another example, HMD device 104 may reproduce audio received, or output recorded, from input device 110 for implementations in which the HMD device includes an audio output device (e.g., speaker, headphones).

Figure 2:
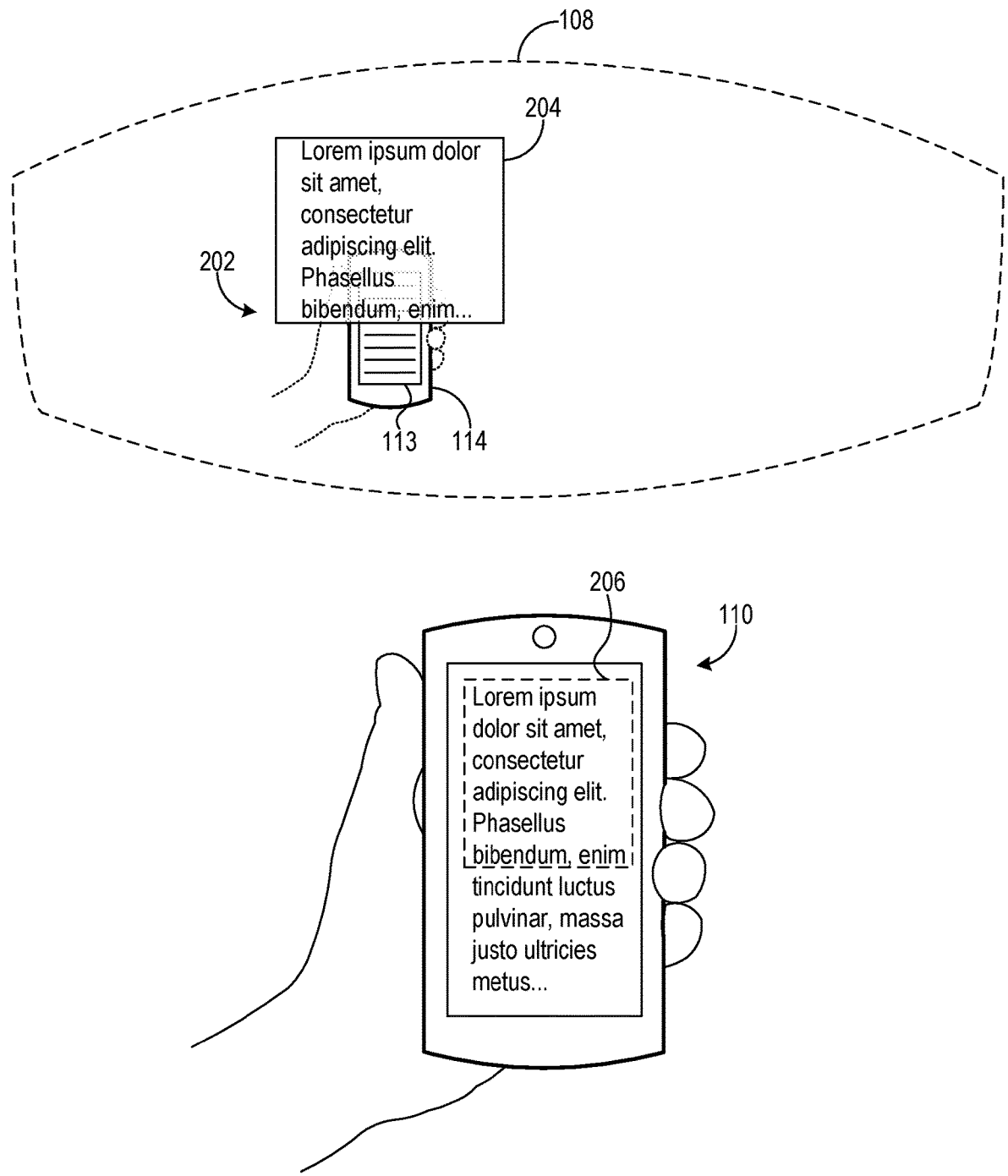
FIG. 2 illustrates an example rendering of a user interface including a magnified representation of visual content.

In some examples, a representation of visual content rendered on touch-sensitive input device 110 may be magnified. As an example of such magnification, FIG. 2 illustrates the rendering of a user interface 202 in region 108 including a magnified representation 204 of visual content rendered on input device 110. Representation 204 magnifies a portion 206 of the visual content rendered on input device 110, whose real-world appearance (were the display active) is illustrated in FIG. 2. In other examples, representation 204 may magnify the entirety of the visual content. Further, representation 204 is rendered in a 3D location proximate to input device 110 where the representation appears to float over the input device, while preserving the visibility of display portion 113 and body portion 114. In this way, the visibility of the visual content rendered on input device 110 is increased while continuing to visually apprise a user of the location of the input device via its virtual representation, which may allow the user to continue interacting with the input device via touch input without disorientation from occlusion by representation 204. As with user interface 112, rendering representation 204 in a 3D location that corresponds to the real-world location of input device 110 may facilitate intuitive interaction with the input device and provide a visual cue with which input can be applied to the input device.

User input may control aspects of the display of representation 204 in various manners. For example, representation 204 may be scrolled to change the visual content shown therein based on a gaze direction of a user. To this end, the sensor system of HMD device 104 may include one or more gaze sensors configured to detect the gaze direction of the user. As another example, the sensor system of HMD device 104 may detect (e.g., via an outward-facing image sensor) a hand gesture that effects scrolling of representation 204. Similarly, gaze, gestural, and/or other inputs may effect or cease the display itself of representation 204.

Figure 3:
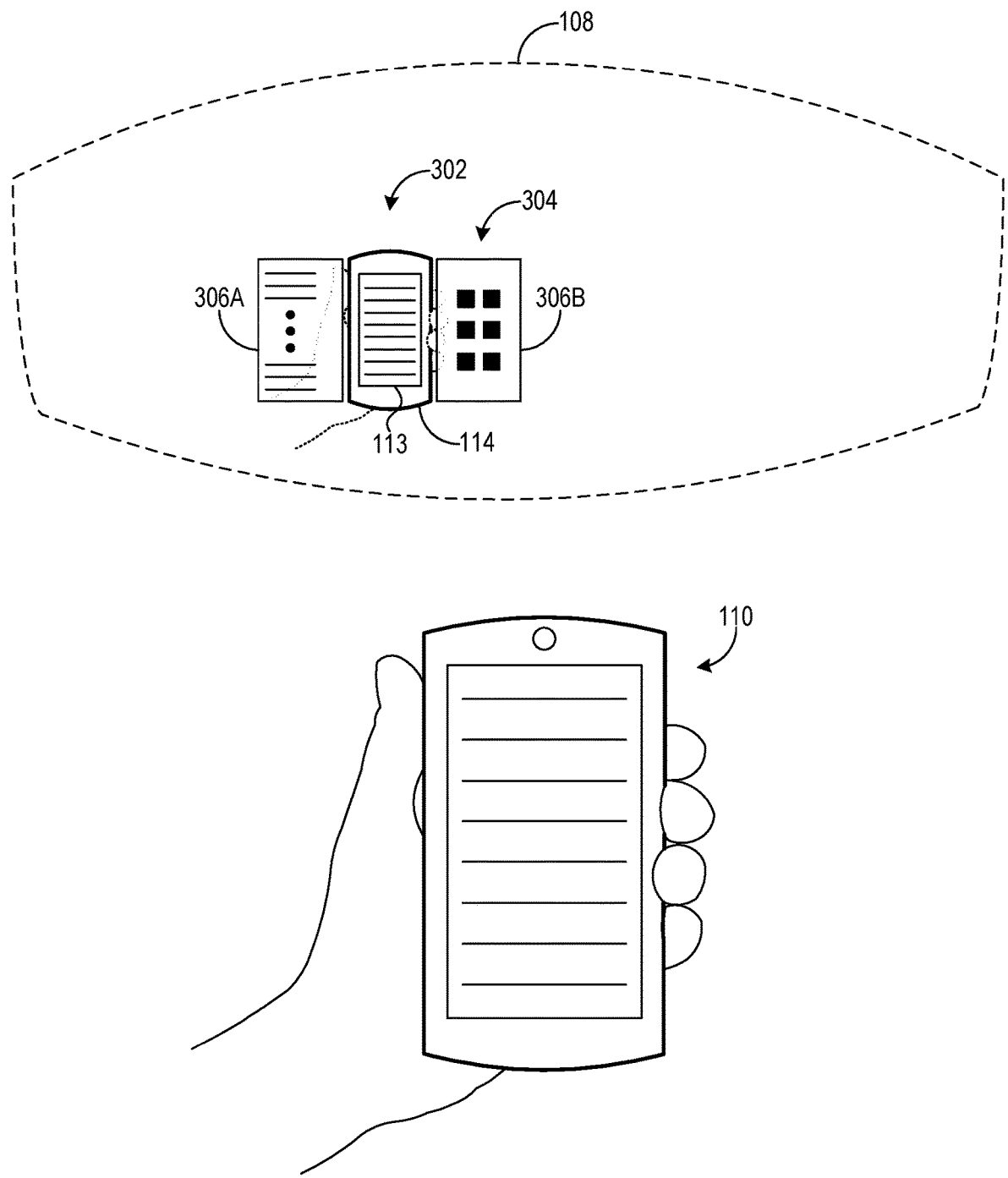
FIG. 3 illustrates an example rendering of multiple user interfaces.

HMD device 104 may render multiple user interfaces based on tracking touch-sensitive input device 110. As an example, FIG. 3 illustrates the rendering of a user interface 302 in combination with an additional user interface 304 in region 108. In contrast to user interface 302, which represents input device 110 via display portion 113 and body portion 114 in 3D locations respectively corresponding to the real-world locations of the display and body of the input device, user interface 304 includes two panels 306A and 306B rendered away from the real-world location of the input device display and body. As shown in FIG. 3, panels 306A and 306B are rendered laterally proximate to the real-world location of the input device display, though the panels may be rendered at other locations spaced away from the real-world location. As such, rendering a user interface "away from" the real-world location of the display of input device 110 as used herein may refer to a variety of locations that do not correspond directly to the real-world location— for example, any 3D location in region 108 that does not correspond to the real-world location. FIG. 3 also illustrates how panels 306A and 306B may be rendered in a manner that they appear locked to the real-world location of the display of input device 110; as this real-world location changes, so too may the 3D locations of the panels change accordingly to appear spatially locked to the input device display. Considered from another perspective, HMD device 104 may render a user interface with multiple different portions/sections. As such, an "additional" user interface as used herein may also refer to a user interface including multiple portions/sections.

In some examples, additional user interface 304 may extend/augment the functionality provided by user interface 302, whose real-world appearance as rendered on touch-sensitive input device 110 is shown (were the display active). For example, additional user interface 304 may include selectable controls not shown in user interface 302 that may relate to the content shown in user interface 302. As one specific example, user interface 302 may display information regarding a purchasable product—e.g., as part of a storefront application executed on HMD device 104. User interface 304 may enhance the shopping experience by presenting, in panel 306A, a listing of related items relevant to the product displayed in user interface 302, and in panel 306E, a comparison of specifications of the product to those of another related item. As another example, user interface 304 may present a settings menu including controls selectable to change settings of an application displayed in user interface 302.

As yet another example of extending/augmenting the functionality provided by user interface 302, user interface 304 may present information regarding a contact with whom a phone or video call is conducted in user interface 302. As still another example, user interface 304 may present information regarding participants in an online game conducted in user interface 302. As further examples, user interface 304 may present instructions (e.g., regarding an application displayed in user interface 302), and/or page(s) of a book (e.g., immediately previous and subsequent pages in panels 308A and 306B, respectively, relative to a current page displayed in user interface 302). Generally, user interface 304 may present any suitable information relating to an interaction carried out through user interface 302, and/or information unrelated to such an interaction.

As HMD device 104 may render user interface 304 away from touch-sensitive input device 110, the input device may be unable to detect user input applied to the additional interface via its touch sensor. As such, HMD device 104 may defect such user input—e.g., by detecting the intersection of a user gaze direction with a selectable portion of user interface 304, and/or by defecting a hand gesture applied to the user additional interface. In some examples, the detection of user input applied to user interface 304 by HMD device 104 may be less accurate than the detection of user input applied to user interface 302 by input device 110. As such, user interface controls for which interaction benefits from higher detection accuracy may be allocated to user interface 302 so that these interactions are detected via the touch sensor of input device 110.

Figure 4:
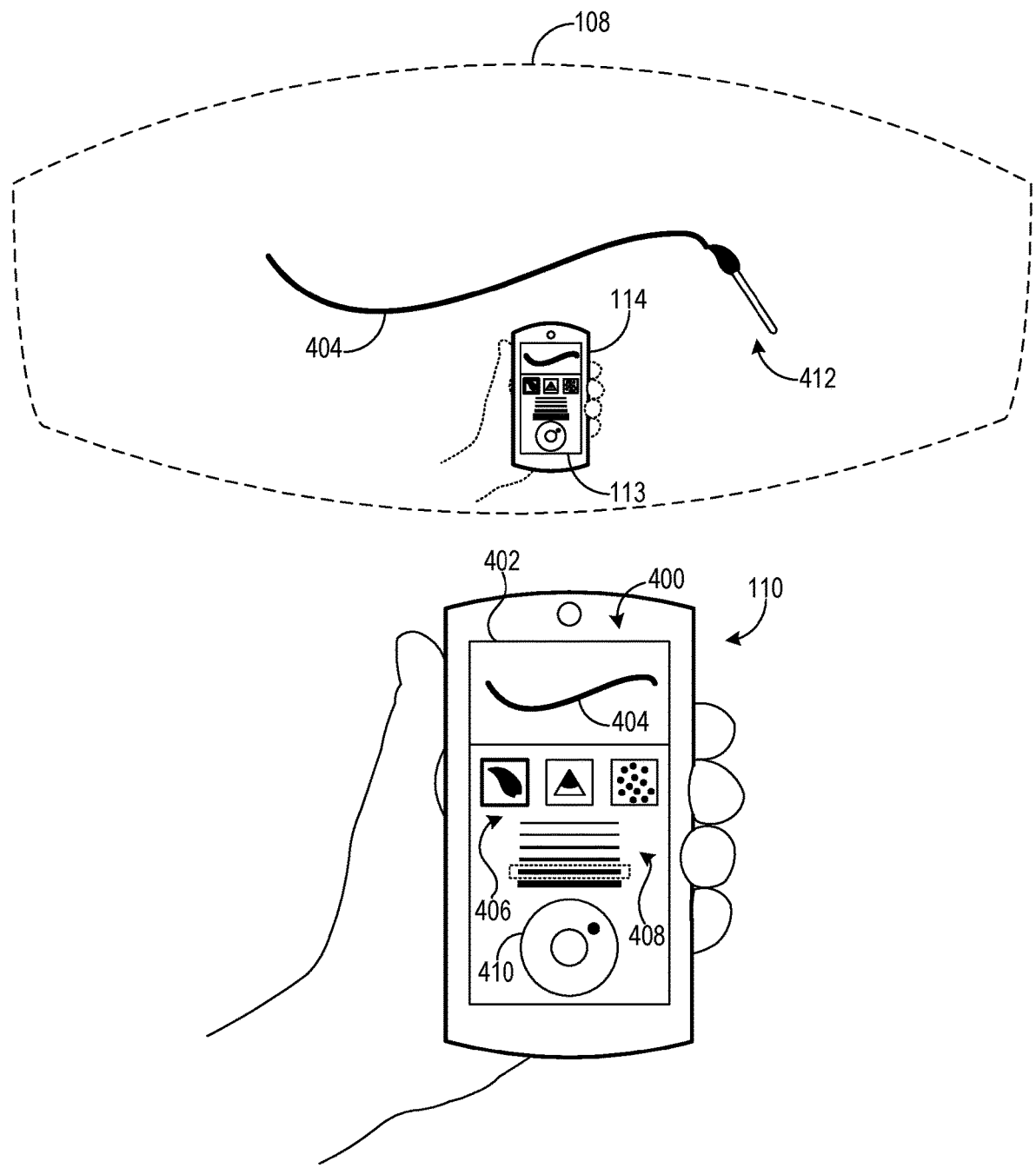
FIG. 4 shows an example user interface configured to facilitate rendering and/or editing of visual content.

In some examples, a user interface may facilitate the rendering of new, and/or editing of existing, visual content on HMD device 104. To this end, FIG. 4 shows a user interface 400 configured to facilitate such rendering and/or editing of visual content. Specifically, FIG. 4 shows the real-world appearance of user interface 400 as rendered on the display of touch-sensitive input device 110 (were the display active) as well as its appearance in the virtual reality experience when represented therein by display portion 113.

User interface 400 includes one or more controls for rendering new visual content. For example, user interface 400 may include a canvas portion 402 in which a user can draw 2D or 3D shapes and images via the application of touch input. FIG. 4 shows one such possible shape 404 drawn in canvas portion 402, which is rendered in region 108 on HMD device 104. Other controls may affect the rendering of visual content. As examples, FIG. 4 shows the inclusion in user interface 400 of brush controls 406, for changing a stroke or pattern that is rendered in response to input applied to canvas portion 402; thickness controls 408, for changing the thickness of the selected stroke/pattern; and a color control 410 in the form of a color wheel for selecting the color of the selected stroke/pattern. As shown, HMD device 104 may render an icon 412 in region 108 representing the selected stroke/pattern at 3D location corresponding to the last location where input was applied in canvas portion 402.

It will thus be understood that user interface 400 may function as a palette of visual content rendering controls. The controls shown in FIG. 4 are provided as examples, and user interface 400 may include alternative and/or additional controls not shown. Further, user interface 400 may be deployed in any suitable context. In addition to its use in a 2D or 3D drawing/rendering application illustrated in FIG. 4, user interface 400 may provide input to other applications and contexts, such as enabling (e.g., by receiving input at canvas portion 402) a user to draw a signature, which may be used to sign a document or illustration, authorize a transaction, or verify an identity, for example.

As described above, shape 404 may represent a 2D or 3D input applied to canvas portion 402. Various approaches may enable the reception of 3D input at canvas portion 402. When touch-sensitive input device 110 is operable to detect a z-coordinate of touch input into/out of the input device—e.g., as a force or pressure—the user may control such force/pressure to vary the z-coordinate of input applied to canvas portion 402. As a particular example, the z-coordinate may be varied as shape 404 is traced along canvas portion 402 so that the shape is rendered with a corresponding variation in apparent depth in region 108. In other examples, gaze and/or hand gesture input may control the z-coordinates of shapes rendered in region 108.

Alternatively or in addition to the use of canvas portion 402 for drawing visual content that is rendered in region 108, movement of touch-sensitive input device 110 may effect the rendering of visual content. For example, HMD device 104 may render shapes in correspondence with the translation of input device 110 throughout real, physical space. Such an approach may enable an intuitive mechanism with which 2D and 3D shapes are formed. For these examples in which movement of input device 110 is used to draw shapes, the representation of input device 110 in region 108 shown in FIG. 4—e.g., portions 113 and 114—may instead be rendered at the 3D location corresponding to the last location in physical space where drawing was performed—e.g., at the 3D location occupied by icon 412, and in lieu of the icon. User interface 400 may continue to provide controls as described herein for varying visual content rendered in response to movement of input device 110, though in some examples HMD device 104 may render the user interface away from the input device (e.g., at a fixed location in region 108).

Figure 5:
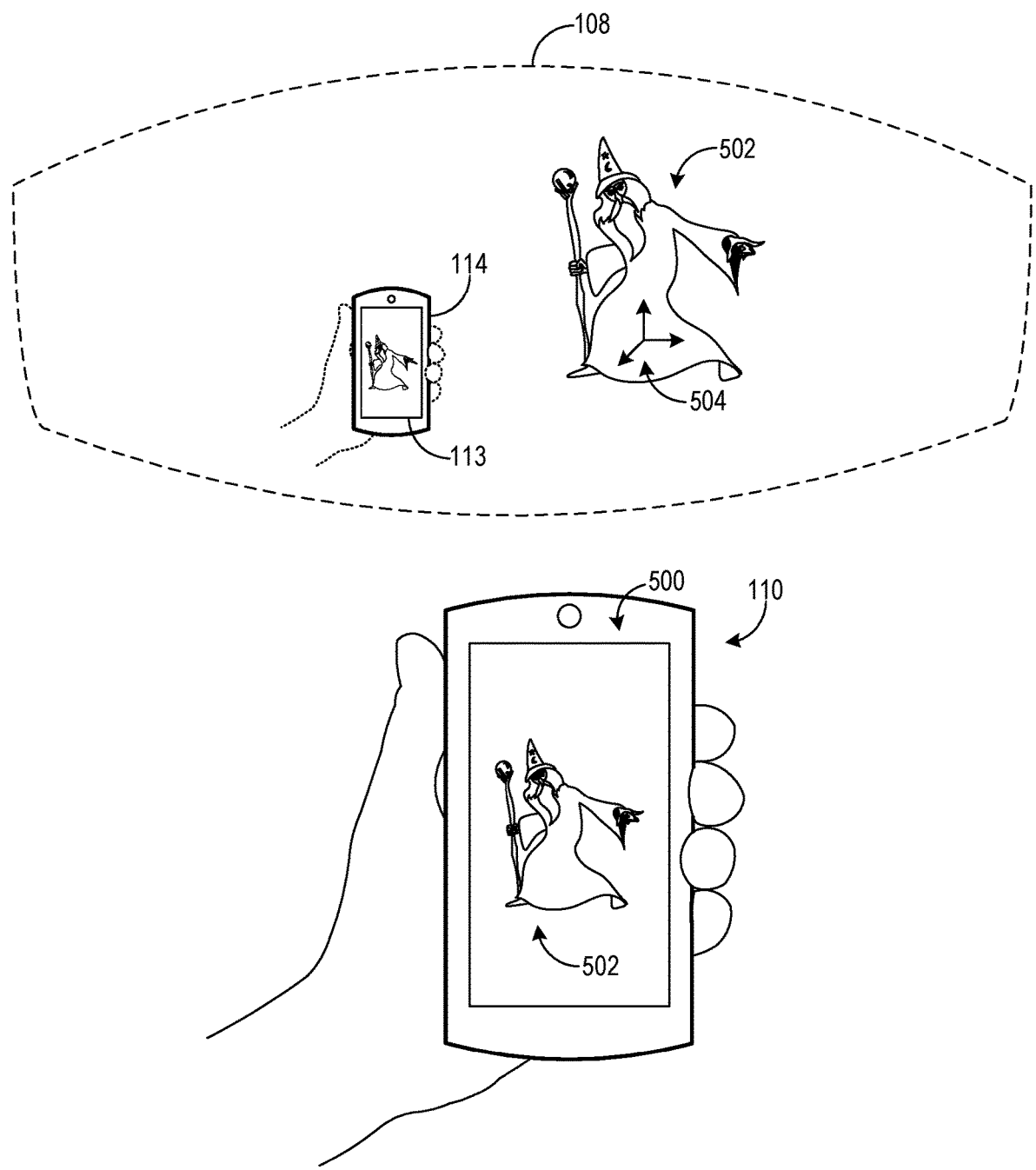
FIG. 5 shows an example user interface in which visual content in the form of a 3D model is rendered.

HMD device 104 may render representations of visual content received from touch-sensitive input device 110 in other ways. As an example, FIG. 5 shows a user interface 500 in which visual content in the form of a 3D model 502 is rendered. Specifically, FIG. 5 shows the real-world appearance of user interface 500 as rendered on the display of touch-sensitive input device 110 (were the display active) as well as its appearance in the virtual reality experience when represented therein by display portion 113.

In the depicted example, 3D model 502 is initially accessed on touch-sensitive input device 110. A user may then transfer 3D model 502 (e.g., if stored on input device 110) to HMD device 104, or cause access to the 3D model by the HMD device (e.g., if the model is stored elsewhere such as a remote network location), via any suitable input, such as a hand gesture in which the user swipes from a location proximate to the input device into the virtual reality experience. HMD device 104 then renders a representation of 3D model 502 in region 108 at a 3D location that, in some examples, may be a function of the location of input device 110—e.g., a virtual location of the input device in the virtual reality experience. Further, HMD device 104 may render a coordinate axes control 504 representing the 3D location of 3D model 502. Control 504 may be manipulated (e.g., via a pointing or grasping hand gesture) to vary the 3D location of 3D model 502 in region 108.

HMD device 104 may receive user input causing an edit to the representation of 3D model 502, and in response render the edited representation in region 108. HMD device 104 may then transfer the edited representation to input device 110, which may store the edited representation for future viewing, editing, distribution, etc. Any suitable user input may be used to edit a representation of visual content rendered in region 108, including but not limited to user input received via touch-sensitive input device 110. For example, user interface 500 may provide a palette of controls selectable to carry out such edits. The palette may also enable the construction of 3D models and scenes, for example by providing controls selectable to transfer geometric primitives into the virtual reality experience, which may then be positioned, transformed, etc., via hand gestures or other suitable inputs. In some examples, HMD device 104 may adjust one or more 3D coordinates of visual content rendered in the virtual reality experience in response to movement (e.g., translation, rotation) of input device 110. Input device 110 may thus function as a clipboard for 3D models and other visual content, and potentially as a palette for affecting the rendering of such visual content.

When user input received at touch-sensitive input device 110 is supplied to a user interface rendered in a virtual reality experience, HMD device 104 may perform a mapping step in supplying the user input to the user interface. This may include mapping a location of the user input on input device 110 to a location in the user interface, which may utilize any suitable mapping function(s). As examples, functions may be used that apply acceleration or otherwise alter kinematic properties associated with the user input, scale a magnitude of the user input, and/or apply user interface magnetism that preferentially biases the mapping toward a location. The location may correspond to a nearest user interface control, a user interface control for which the user input is considered intended or likeliest, and/or a user interface control historically preferred by the user, for example.

Figure 6:
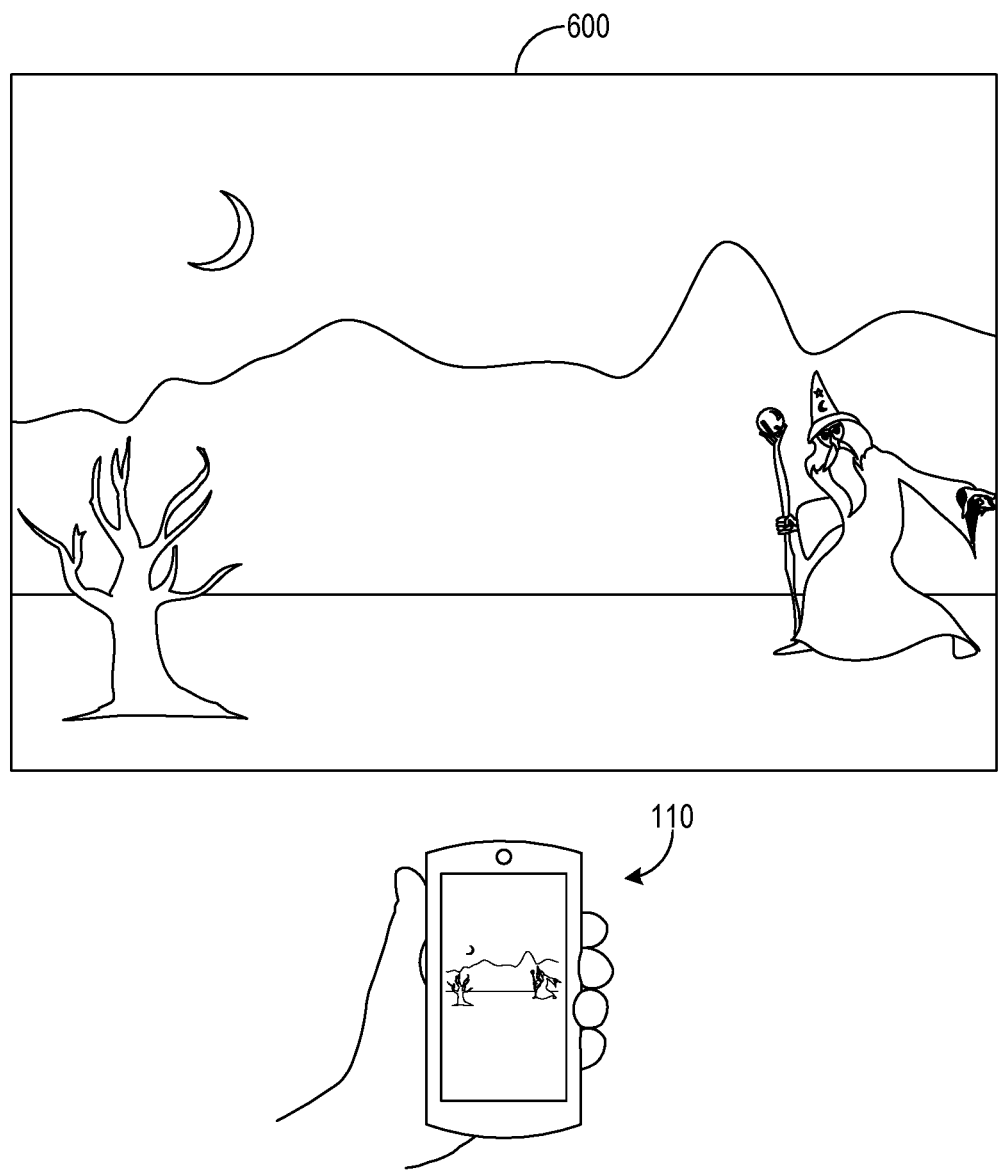
FIG. 6 shows an example representation of a virtual reality experience.
Figure 8:
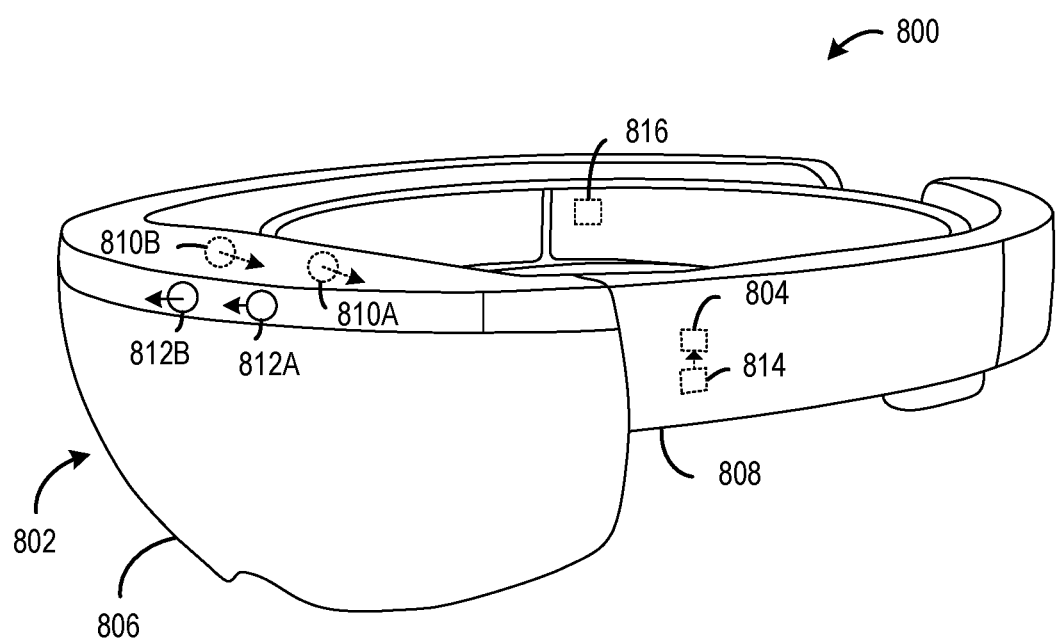
FIG. 8 shows aspects of an example virtual-reality computing system.

Other modes of interaction between touch-sensitive input device 110 and HMD device 104 are contemplated. FIG. 8 illustrates an example in which input device 110 may facilitate the capture of representations of the virtual reality experience executed on HMD device 104. In particular, FIG. 6 shows a representation of the virtual reality experience, in the form of an image 600, saved from the perspective of input device 110 relative to the virtual reality experience. Here, a user input (e.g., gaze location, gesture, voice command) may cause HMD device 104 to determine the perspective (e.g., frustum) of input device 110 based on its tracked location and orientation, from which a representation of the virtual reality experience is rendered and saved. Input device 110 may thus function analogously to a real-world camera or other touch-sensitive input devices that provide image capture functionality in the real-world, but acting to capture image data or other representations in virtual reality. Image 600 may assume any suitable form, such as that of a 2D image or 3D image (e.g., with which the captured scene may be viewed from different perspectives on HMD device 104), or 2D/3D video, which may include audio originating from the virtual reality experience (e.g., originating from a simulated 3D location where the image is captured) and/or real, physical environment.

Touch-sensitive input device 110 may also facilitate the capture of a so-called "selfie" of the user of HMD device 104—known more formally as a self-portrait. For example, the user may orient an image-capturing surface of input device 110 toward oneself and supply a user input causing capture of an image or other representation. From this perspective, HMD device 104 may represent the user by augmenting or replacing the real, physical appearance of the user with virtual imagery such as a virtual 3D model (e.g., determined from the context of the virtual reality experience). For examples in which at least a portion of the real, physical appearance of the user is used in generating such representations, image data may be captured via one or more image sensors external to HMD device 104, such as an image sensor included in input device 110.

In some examples, HMD device 104 may render a representation of the real-world environment in the virtual reality experience. The representation may be rendered at a 3D location corresponding to a real-world location of touch-sensitive input device 110. For example, with reference to FIG. 1, HMD device 104 may render the representation in display portion 113, in which case input device 110 may appear as a virtual window into the real, physical environment. As another example, the representation may be rendered within a portion of region 108 that extends from a perspective of input device 110—e.g., within a view frustum of the input device. Image data used to render the representation may be collected via an image sensor in input device 110, for example, or via any other suitable method. The representation may serve to enable a variety of interaction scenarios with the physical environment, such as conversations with other users in the physical environment.

Figure 7:
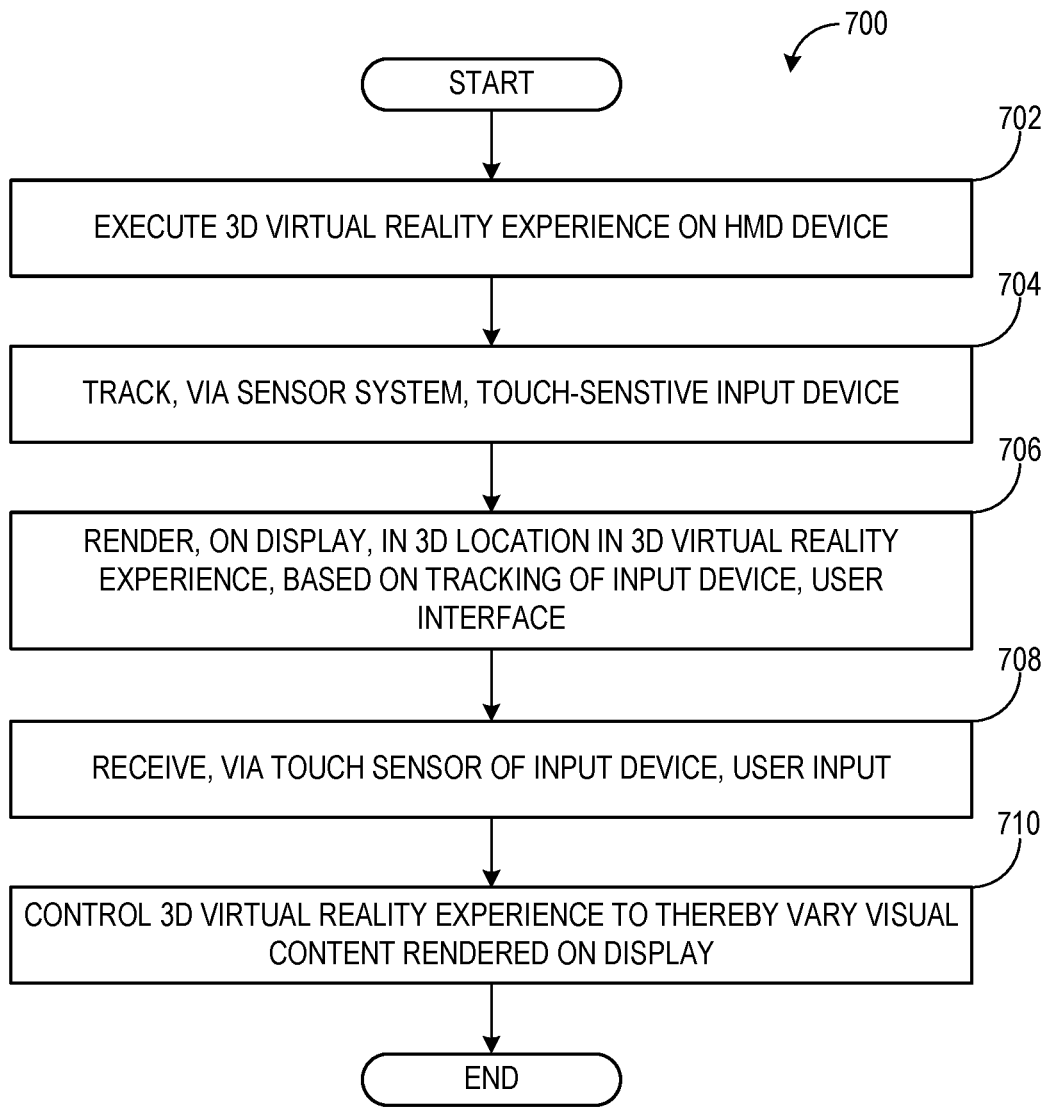
FIG. 7 shows a flowchart illustrating an example method of receiving virtual reality input on an HMD device.

FIG. 7 shows a flowchart illustrating an example method 700 of receiving virtual reality input on an HMD device. Method 700 may be implemented on HMD device 104, for example.

At 702, method 700 includes executing a 3D virtual reality experience on the HMD device. Executing the 3D virtual reality experience may include rendering, on a display of the HMD device, virtual content.

At 704, method 700 includes tracking, via a sensor system of the HMD device, a touch-sensitive input device. Tracking the input device may include receiving signals from the input device, which may include coordinates regarding the position and/or orientation of the input device, and/or tracking the input device via one or more optical sensors of the HMD device.

At 706, method 700 includes rendering, on the display of the HMD device, in a 3D location in the 3D virtual reality experience based on the tracking of the touch-sensitive input device, a user interface. The user interface may include a representation of the input device, such as a display and/or body portion that respectively represent the display and body of the input device. The user interface may be rendered in a 3D location corresponding to a real-world location of a display of the input device. The user interface may include one or more controls selectable to vary visual content rendered on the HMD device.

At 708, method 700 includes receiving, via a touch sensor of the touch-sensitive input device, a user input. A location of the user input on the input device may be mapped to a location in the user interface.

At 710, method 700 includes, in response to receiving the user input, controlling the 3D virtual reality experience to thereby vary visual content being rendered on the display of the HMD device. Varying the visual content may include rendering new visual content based on a selected one of one or more controls of the user interface. Varying the visual content may include rendering an additional user interface away from the real-world location of the display of the touch-sensitive input device. Varying the visual content may include rendering a representation of visual content received from the touch-sensitive display input device. Varying the visual content may include rendering an edited representation of the visual content received from the touch-sensitive display input device. Varying the visual content may include magnifying the representation. Varying the visual content may include rendering a representation of a real-world environment at a 3D location in the 3D virtual reality experience corresponding to a real-world location of the touch-sensitive input device.

FIG. 8 shows aspects of an example virtual-reality computing system 800 including a near-eye display 802. The virtual-reality computing system 800 is a non-limiting example of the virtual-reality computing devices described above such as HMD device 104, and may be used for displaying and modifying virtual imagery. Virtual reality computing system 800 may be implemented as computing system 900 shown in FIG. 9.

The virtual-reality computing system 800 may be configured to present any suitable type of virtual-reality experience. In some implementations, the virtual-reality experience includes a totally virtual experience in which the near-eye display 802 is opaque, such that the wearer is completely absorbed in the virtual-reality imagery provided via the near-eye display 802. In other implementations, the virtual-reality experience includes an augmented-reality experience in which the near-eye display 802 is wholly or partially transparent from the perspective of the wearer, to give the wearer a view of the surrounding real-world physical space. In such a configuration, the near-eye display 802 is configured to direct display light to the user's eye(s) so that the user will see augmented-reality objects that are not actually present in the physical space. In other words, the near-eye display 802 may direct display light to the user's eye(s) while light from the physical space passes through the near-eye display 802 to the user's eye(s). As such, the user's eye(s) simultaneously receive light from the physical environment and display light.

In such augmented-reality implementations, the virtual-reality computing system 800 may be configured to visually present augmented-reality objects that appear body-locked and/or world-locked. A body-locked augmented-reality object may appear to move along with a perspective of the user as a pose (e.g., six degrees of freedom (DOF): x, y, z, yaw, pitch, roll) of the virtual-reality computing system 800 changes. As such, a body-locked, augmented-reality object may appear to occupy the same portion of the near-eye display 802 and may appear to be at the same distance from the user, even as the user moves in the physical space. Alternatively, a world-locked, augmented-reality object may appear to remain in a fixed location in the physical space, even as the pose of the virtual-reality computing system 800 changes. When the virtual-reality computing system 800 visually presents world-locked, augmented-reality objects, such a virtual-reality experience may be referred to as a mixed-reality experience. In some examples, a world-locked object may appear to move in correspondence with movement of a real, physical object.

In some implementations, the opacity of the near-eye display 802 is controllable dynamically via a dimming filter. A substantially see-through display, accordingly, may be switched to full opacity for a fully immersive virtual-reality experience.

The virtual-reality computing system 800 may take any other suitable form in which a transparent, semi-transparent, and/or non-transparent display is supported in front of a viewer's eye(s). Further, implementations described herein may be used with, any other suitable computing device, including but not limited to wearable computing devices, mobile computing devices, laptop computers, desktop computers, smart phones, tablet computers, etc.

Any suitable mechanism may be used to display images via the near-eye display 802. For example, the near-eye display 802 may include image-producing elements located within lenses 806. As another example, the near-eye display 802 may include a display device, such as a liquid crystal on silicon (LCOS) device or OLED microdisplay located within a frame 808. In this example, the lenses 806 may serve as, or otherwise include, a light guide for delivering light from the display device to the eyes of a wearer. Additionally, or alternatively, the near-eye display 802 may present left-eye and right-eye virtual-reality images via respective left-eye and right-eye displays.

The virtual-reality computing system 800 includes an on-board computer 804 configured to perform various operations related to receiving user input (e.g., gesture recognition, eye gaze detection), visual presentation of virtual-reality images on the near-eye display 802, and other operations described herein. In some implementations, some to all of the computing functions described above, may be performed off board.

The virtual-reality computing system 800 may include various sensors and related systems to provide information to the on-board computer 804. Such sensors may include, but are not limited to, one or more inward facing image sensors 810A and 810B, one or more outward facing image sensors 812A and 812B, an inertial measurement unit (IMU) 814, and one or more microphones 816. The one or more inward facing image sensors 810A, 810B may be configured to acquire gaze tracking information from a wearer's eyes (e.g., sensor 810A may acquire image data for one of the wearer's eye and sensor 810B may acquire image data for the other of the wearer's eye). One or more such sensors may be used to implement sensor system 116 of HMD device 104, for example.

The on-board computer 804 may be configured to determine gaze directions of each of a wearer's eyes in any suitable manner based on the information received from the image sensors 810A, 810B. The one or more inward facing image sensors 810A, 810B, and the on-board computer 804 may collectively represent a gaze detection machine configured to determine a wearer's gaze target on the near-eye display 802. In other implementations, a different type of gaze detector/sensor may be employed to measure one or more gaze parameters of the user's eyes. Examples of gaze parameters measured by one or more gaze sensors that may be used by the on-board computer 804 to determine an eye gaze sample may include an eye gaze direction, head orientation, eye gaze velocity, eye gaze acceleration, change in angle of eye gaze direction, and/or any other suitable tracking information. In some implementations, eye gaze tracking may be recorded independently for both eyes.

The one or more outward facing image sensors 812A, 812B may be configured to measure physical environment attributes of a physical space. In one example, image sensor 812A may include a visible-light camera configured to collect a visible-light image of a physical space. Further, the image sensor 812B may include a depth camera configured to collect a depth image of a physical space. More particularly, in one example, the depth camera is an infrared time-of-flight depth camera. In another example, the depth camera is an infrared structured light depth camera.

Data from the outward facing image sensors 812A, 812B may be used by the on-board computer 804 to detect movements, such as gesture-based inputs or other movements performed by a wearer or by a person or physical object in the physical space. In one example, data from the outward facing image sensors 812A, 812B may be used to detect a wearer input performed by the wearer of the virtual-reality computing system 800, such as a gesture. Data from the outward facing image sensors 812A, 812B may be used by the on-board computer 804 to determine direction/location and orientation data (e.g., from imaging environmental features) that enables position/motion tracking of the virtual-reality computing system 800 in the real-world environment. In some implementations, data from the outward facing image sensors 812A, 812B may be used by the on-board computer 804 to construct still images and/or video images of the surrounding environment from the perspective of the virtual-reality computing system 800.

The IMU 814 may be configured to provide position and/or orientation data of the virtual-reality computing system 800 to the on-board computer 804. In one implementation, the IMU 814 may be configured as a three-axis or three-degree of freedom (3DOF) position sensor system. This example position sensor system may, for example, include three gyroscopes to indicate or measure a change in orientation of the virtual-reality computing system 800 within 3D space about three orthogonal axes (e.g., roll, pitch, and yaw).

In another example, the IMU 814 may be configured as a six-axis or six-degree of freedom (6DOF) position sensor system. Such a configuration may include three accelerometers and three gyroscopes to indicate or measure a change in location of the virtual-reality computing system 800 along three orthogonal spatial axes (e.g., x, y, and z) and a change in device orientation about three orthogonal rotation axes (e.g., yaw, pitch, and roll). In some implementations, position and orientation data from the outward facing image sensors 812A, 812B and the IMU 814 may be used in conjunction to determine a position and orientation (or 6DOF pose) of the virtual-reality computing system 800.

The virtual-reality computing system 800 may also support other suitable positioning techniques, such as GPS or other global navigation systems. Further, while specific examples of position sensor systems have been described, it will be appreciated that any other suitable sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

The one or more microphones 816 may be configured to measure sound in the physical space. Data from the one or more microphones 816 may be used by the on-board computer 804 to recognize voice commands provided by the wearer to control the virtual-reality computing system 800.

The on-board computer 804 may include a logic machine and a storage machine, discussed in more detail below with respect to FIG. 9, in communication with the near-eye display 802 and the various sensors of the virtual-reality computing system 800.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
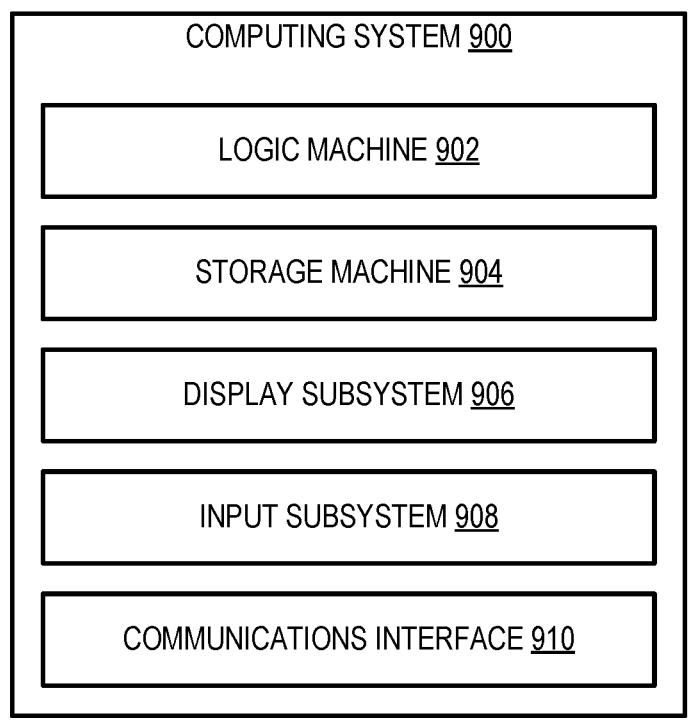
FIG. 9 shows a block diagram of an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold instructions executable by the logic machine to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 902 executing instructions held by storage machine 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. For example, HMD device 104 may implement at least a portion of communication subsystem 910 to receive and/or transmit data (e.g., position and/or orientation signals, display output signals, user input signals) from/to touch-sensitive input device 110. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

Another example provides a head-mounted display device comprising a sensor system, a display, a logic machine, and a storage machine holding instructions executable by the logic machine to execute a 3D virtual reality experience on the head-mounted display device, track, via the sensor system, a touch-sensitive input device, render, on the display, in a 3D location in the 3D virtual reality experience based on the tracking of the touch-sensitive input device, a user interface, receive, via a touch sensor of the touch-sensitive input device, a user input, and in response to receiving the user input, control the 3D virtual reality experience to thereby vary visual content being rendered on the display. In such an example, the user interface alternatively or additionally may include a representation of the touch-sensitive input device. In such an example, the instructions alternatively or additionally may be executable to map a location of the user input on the touch-sensitive input device to a location in the user interface. In such an example, the 3D location in which the user interface is rendered alternatively or additionally may correspond to a real-world location of a display of the touch-sensitive input device. In such an example, the user interface alternatively or additionally may include one or more controls, and the instructions executable to control the 3D virtual reality experience to thereby vary visual content being rendered on the display alternatively or additionally may be executable to render new visual content based on a selected one of the one or more controls. In such an example, the instructions alternatively or additionally may be executable to render an additional user interface away from the real-world location of the display of the touch-sensitive input device, and receive, via the sensor system, a user input applied to the additional user interface. In such an example, the instructions executable to control the 3D virtual reality experience to thereby vary visual content being rendered on the display alternatively or additionally may be executable to render a representation of visual content received from the touch-sensitive input device. In such an example, the instructions alternatively or additionally may be executable to receive an additional user input causing an edit to the representation, and render the edited representation on the display. In such an example, the instructions alternatively or additionally may be executable to transmit the edited representation to the touch-sensitive input device. In such an example, the instructions alternatively or additionally may be executable to adjust one or more 3D coordinates of the visual content in the 3D virtual reality experience in response to movement of the touch-sensitive input device. In such an example, the user interface alternatively or additionally may include a representation of visual content rendered on the touch-sensitive input device. In such an example, the instructions executable to control the 3D virtual reality experience to thereby vary visual content being rendered on the display alternatively or additionally may be executable to magnify the representation. In such an example, the instructions alternatively or additionally may be executable to save a representation of the 3D virtual reality experience in response to receiving the user input, the representation being saved from a perspective of the touch-sensitive input device relative to the 3D virtual reality experience. In such an example, the instructions executable to control the 3D virtual reality experience to thereby vary visual content being rendered on the display alternatively or additionally may be executable to render a representation of a real-world environment at a 3D location in the 3D virtual reality experience corresponding to a real-world location of the touch-sensitive input device.

Another example provides on a head-mounted display device, a method of receiving virtual reality input, comprising executing a 3D virtual reality experience on the head-mounted display device, tracking, via a sensor system of the head-mounted display device, a touch-sensitive input device, rendering, on a display of the head-mounted display device, in a 3D location in the 3D virtual reality experience based on the tracking of the touch-sensitive input device, a user interface, receiving, via a touch sensor of the touch-sensitive input device, a user input, and in response to receiving the user input, controlling the 3D virtual reality experience to thereby vary visual content being rendered on the display, in such an example, the user interface alternatively or additionally may include a representation of the touch-sensitive input device. In such an example, controlling the 3D virtual reality experience to thereby vary visual content being rendered on the display alternatively or additionally may include rendering a representation of visual content received from the touch-sensitive input device. In such an example, the user interface alternatively or additionally may include one or more controls, and controlling the 3D virtual reality experience to thereby vary visual content being rendered on the display alternatively or additionally may include rendering new visual content based on a selected one of the one or more controls.

Another example provides a head-mounted display device, comprising a sensor system, a display, a logic machine, and a storage machine holding instructions executable by the logic machine to execute a 3D virtual reality experience on the head-mounted display device, track, via the sensor system, a touch-sensitive input device, render, on the display, in a 3D location in the 3D virtual reality experience based on the tracking of the touch-sensitive input device, a user interface including a representation of the touch-sensitive input device, receive, via a touch sensor of the touch-sensitive input device, a user input, and in response to receiving the user input, control the 3D virtual reality experience to thereby vary visual content being rendered on the display. In such an example, the user interface alternatively or additionally may include a representation of visual content rendered on the touch-sensitive input device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head-mounted display device, comprising:
a sensor system;
a display;
a logic machine; and
a storage machine holding instructions executable by the logic machine to:
execute a 3D virtual reality experience on the head-mounted display device;
track, via the sensor system, a touch-sensitive input device;
render a user interface on the display, the user interface being rendered in a 3D location in the 3D virtual reality experience based on the tracking of the touch-sensitive input device;
receive, via a touch sensor of the touch-sensitive input device, a user input;
in response to receiving the user input, control the 3D virtual reality experience to thereby vary visual content being rendered on the display by rendering a representation of visual content received from the touch-sensitive input device;
receive an additional user input causing an edit to the representation;
render the edited representation on the display; and
transmit the edited representation to the touch-sensitive input device.

2. The head-mounted display device of claim 1, where the user interface includes a representation of the touch-sensitive input device.

3. The head-mounted display device of claim 1, where the instructions are further executable to map a location of the user input on the touch-sensitive input device to a location in the user interface.

4. The head-mounted display device of claim 1, where the 3D location in which the user interface is rendered corresponds to a real-world location of a display of the touch-sensitive input device.

5. The head-mounted display device of claim 4, where the user interface includes one or more controls, and where the instructions executable to control the 3D virtual reality experience to thereby vary visual content being rendered on the display are executable to render new visual content based on a selected one of the one or more controls.

6. The head-mounted display device of claim 4, where the instructions are further executable to:
render an additional user interface away from the real-world location of the display of the touch-sensitive input device; and
receive, via the sensor system, a user input applied to the additional user interface.

7. The head-mounted display device of claim 1, where the instructions are further executable to adjust one or more 3D coordinates of the visual content in the 3D virtual reality experience in response to movement of the touch-sensitive input device.

8. The head-mounted display device of claim 1, where the instructions executable to control the 3D virtual reality experience to thereby vary visual content being rendered on the display are executable to magnify the representation.

9. The head-mounted display device of claim 1, where the instructions executable to control the 3D virtual reality experience to thereby vary visual content being rendered on the display are executable to render a representation of a real-world environment at a 3D location in the 3D virtual reality experience corresponding to a real-world location of the touch-sensitive input device.

10. On a head-mounted display device, a method of receiving virtual reality input, comprising:
- executing a 3D virtual reality experience on the head-mounted display device;
- tracking, via a sensor system of the head-mounted display device, a touch-sensitive input device;
- rendering, on a display of the head-mounted display device, in a 3D location in the 3D virtual reality experience based on the tracking of the touch-sensitive input device, a user interface;
- receiving, via a touch sensor of the touch-sensitive input device, a user input;
- in response to receiving the user input, controlling the 3D virtual reality experience to thereby vary visual content being rendered on the display by rendering a representation of visual content received from the touch-sensitive input device;
- receiving an additional user input causing an edit to the representation;
- rendering the edited representation on the display; and
- transmitting the edited representation to the touch-sensitive input device.

11. The method of claim 10, where the user interface includes a representation of the touch-sensitive input device.

12. The method of claim 10, where the user interface includes one or more controls, and where controlling the 3D virtual reality experience to thereby vary visual content being rendered on the display includes rendering new visual content based on a selected one of the one or more controls.

13. A head-mounted display device, comprising:
- a sensor system;
- a display;
- a logic machine; and
- a storage machine holding instructions executable by the logic machine to:
  - execute a 3D virtual reality experience on the head-mounted display device;
  - track, via the sensor system, a touch-sensitive input device;
  - render, on the display, in a 3D location in the 3D virtual reality experience based on the tracking of the touch-sensitive input device, a user interface including a representation of the touch-sensitive input device;
  - receive, via a touch sensor of the touch-sensitive input device, a user input;
  - in response to receiving the user input, control the 3D virtual reality experience to thereby vary visual content being rendered on the display by rendering a representation of visual content received from the touch-sensitive input device;
  - receive an additional user input causing an edit to the representation of the visual content;
  - render the edited representation on the display; and
  - transmit the edited representation to the touch-sensitive input device.

* * * * *